(12) United States Patent
La Gorce

(10) Patent No.: US 10,850,455 B2
(45) Date of Patent: Dec. 1, 2020

(54) AUTOMATED FIBER PLACEMENT ROLLER

(71) Applicant: THE BOEING COMPANY, Chicago, IL (US)

(72) Inventor: Adam La Gorce, Maple Valley, WA (US)

(73) Assignee: THE BOEING COMPANY, Chicago, IL (US)

( * ) Notice: Subject to any disclaimer, the term of this patent is extended or adjusted under 35 U.S.C. 154(b) by 46 days.

(21) Appl. No.: 16/397,589

(22) Filed: Apr. 29, 2019

(65) Prior Publication Data

US 2020/0338839 A1 Oct. 29, 2020

(51) Int. Cl.
*B29C 70/38* (2006.01)

(52) U.S. Cl.
CPC .................. *B29C 70/384* (2013.01)

(58) Field of Classification Search
CPC .... B29C 70/384; B29C 70/382; B29C 70/388
See application file for complete search history.

(56) References Cited

U.S. PATENT DOCUMENTS

| 9,248,591 B2 * | 2/2016 | Caffiau | B29C 70/384 |
| 2011/0011537 A1 * | 1/2011 | Hamlyn | B29C 70/384 |
| | | | 156/436 |
| 2014/0102625 A1 * | 4/2014 | De Mattia | B32B 5/26 |
| | | | 156/166 |

OTHER PUBLICATIONS

Rakhshbahar, et al., "A Novel Approach: Combination of Automated Fiber Placement (AFP) and Additive Layer Manufacturing (ALM)", Journal of Composite Sciences, J. Compos. Sci. 2018, 2, 42, www.mdpi.com/journal/jcs, pp. 1-9.

* cited by examiner

*Primary Examiner* — Jeffry H Aftergut
(74) *Attorney, Agent, or Firm* — Moore Intellectual Property Law, PLLC

(57) ABSTRACT

An automated fiber placement roller includes a metallic rim member arranged about a central axis and having an inner side and an outer side. The central axis is closer to the inner side than to the outer side, and the inner side defines a plurality of grooves enabling elastic deformation of the metallic rim member responsive to a force applied to the outer side. The automated fiber placement roller also includes a metallic hub member arranged substantially concentric with the metallic rim member about the central axis. The metallic hub member defines an opening to receive a shaft of an automated fiber placement machine. The automated fiber placement roller further includes a plurality of curved metallic interconnect members extending between the metallic hub member and the metallic rim member. Each of the plurality of curved metallic interconnect members is elastically deformable responsive to the force applied to the outer side.

20 Claims, 5 Drawing Sheets

AUTOMATED FIBER PLACEMENT ROLLER

FIELD OF THE DISCLOSURE

The present disclosure is generally related to automated fiber placement for composite layup.

BACKGROUND

Composite layup involves forming layers of polymer-embedded fiber material into a specified shape to form an object. The polymer-embedded fiber material can be positioned manually or can be positioned automatically using an automated fiber placement machine. An automated fiber placement machine usually places the polymer-embedded fiber material as strips of material referred to as tows or fiber tows. A roller of the automated fiber placement machine rolls over each tow to press it into place on a tooling surface or on a previously placed layer to form the specified shape.

After one or more layers of the polymer-embedded fiber material are positioned as desired, a polymer of the polymer-embedded fiber material is hardened to secured the polymer-embedded fiber material in position. When the polymer includes a thermoset polymer, the polymer is usually cured by application of heat or ultraviolet light. If the polymer includes a thermoplastic polymer, the polymer is usually softened using heat and hardened by removing heat.

The rollers used by automated fiber placement machines have historically been formed of polymers. However, polymer-based rollers do not last long when the polymer-embedded fiber material uses a thermoplastic polymer because temperatures used to soften the thermoplastic polymer tend to soften the roller, which can significantly reduce the useful life of the roller.

SUMMARY

In a particular implementation, an automated fiber placement roller includes a metallic rim member arranged about a central axis and having an inner side and an outer side. The central axis is closer to the inner side than to the outer side, and the inner side defines a plurality of grooves enabling elastic deformation of the metallic rim member responsive to a force applied to the outer side. The automated fiber placement roller also includes a metallic hub member arranged substantially concentric with the metallic rim member about the central axis. The metallic hub member defines an opening to receive a shaft of an automated fiber placement machine. The automated fiber placement roller further includes a plurality of curved metallic interconnect members extending between the metallic hub member and the metallic rim member. Each of the plurality of curved metallic interconnect members is elastically deformable responsive to the force applied to the outer side.

In another particular implementation, an automated fiber placement machine includes a fiber placement head and one or more actuators. The one or more actuators are configured to adjust a relative position of a roller and a workpiece during addition of one or more fiber tows to the workpiece by the fiber placement head. The fiber placement head includes the roller and a shaft extending through a central opening of the roller. The roller is rotatable about the shaft. The roller includes a metallic rim member concentric with the central opening about a central axis and having an inner side and an outer side. The central axis is closer to the inner side than to the outer side, and the inner side defines a plurality of grooves enabling elastic deformation of the metallic rim member responsive to a force applied to the outer side. The roller also includes a metallic hub member defining the central opening and a plurality of curved metallic interconnect members. The curved metallic interconnect members extend between the metallic hub member and the metallic rim member, and each of the plurality of curved metallic interconnect members is elastically deformable responsive to the force applied to the outer side.

In another particular implementation, a method of automated composite layup includes applying heat to a portion of a workpiece using a heat source coupled to a fiber placement head of an automated fiber placement machine. The method also includes, after applying the heat to the portion of the workpiece, moving a roller of the fiber placement head over the portion of the workpiece while the roller presses one or more tows into contact with the portion of the workpiece. The method further includes, while moving the roller over the portion of the workpiece, cooling the roller to dissipate at least a portion of the heat. The roller is cooled by airflow between a metallic rim member of the roller, a metallic hub member of the roller, and a plurality of curved metallic interconnect members of the roller. The curved metallic interconnect members extend between the metallic hub member and the metallic rim member. An inner side of the metallic rim member defines a plurality of grooves. The plurality of grooves and the plurality of curved metallic interconnect members enable elastic deformation of the roller responsive to a force applied to press the one or more tows into contact with the portion of the workpiece.

DETAILED DESCRIPTION

Figure 1:
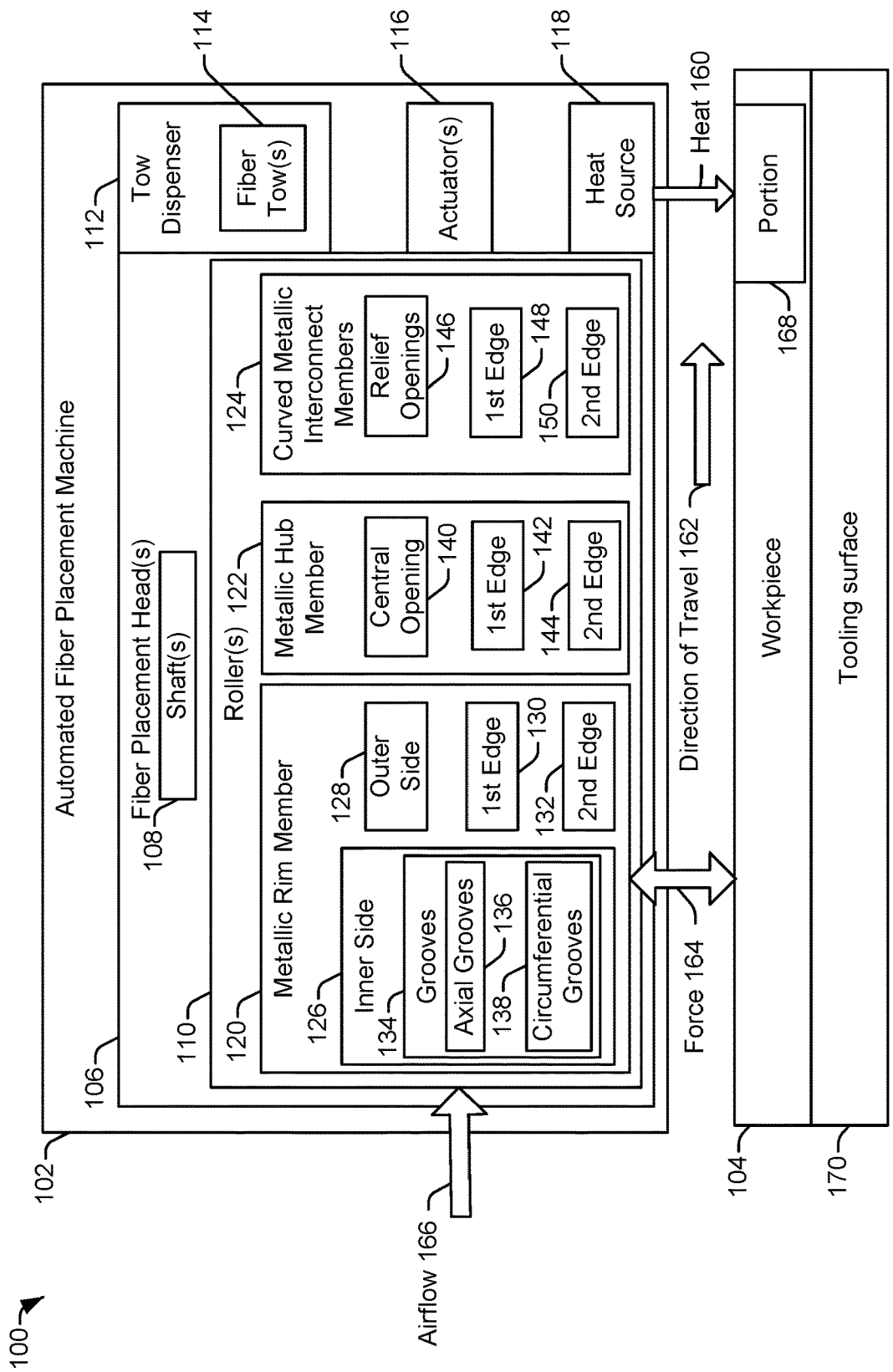
FIG. 1 is a diagram that illustrates an example of a system for automated fiber placement according to a particular implementation.

Particular implementations are described herein with reference to the drawings. In the description, common features are designated by common reference numbers throughout the drawings. In some drawings, multiple instances of a particular type of feature are used. Although these features are physically and/or logically distinct, the same reference number is used for each, and the different instances are distinguished by addition of a letter to the reference number. When the features as a group or a type are referred to herein (e.g., when no particular one of the features is being referenced), the reference number is used without a distinguishing letter. However, when one particular feature of multiple features of the same type is referred to herein, the reference number is used with the distinguishing letter. For example, referring to FIG. 2, multiple actuators 116A and 116B are shown. When referring to a particular one of these actuators, such as the actuator 116A, the distinguishing letter "A" is used. However, when referring to any arbitrary one of these actuators or to these actuators as a group, the reference number 116 is used without a distinguishing letter.

As used herein, various terminology is used for the purpose of describing particular implementations only and is not intended to be limiting. For example, the singular forms "a," "an," and "the" are intended to include the plural forms as well, unless the context clearly indicates otherwise. Further, the terms "comprise," "comprises," and "comprising" may be used interchangeably with "include," "includes," or "including." Additionally, it will be understood that the term "wherein" may be used interchangeably with "where." As used herein, "exemplary" may indicate an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority, order, or position of the element with respect to another element, but rather merely distinguishes the element from another element having a same name (but for use of the ordinal term). As used herein, the term "set" refers to a grouping of one or more elements, and the term "plurality" refers to multiple elements.

In the present disclosure, terms such as "determining", "calculating", "generating", "adjusting", "modifying", etc. may be used to describe how one or more operations are performed. It should be noted that such terms are not to be construed as limiting and other techniques may be utilized to perform similar operations. Additionally, as referred to herein, "generating", "calculating", "using", "selecting", "accessing", and "determining" may be used interchangeably. For example, "generating", "calculating", or "determining" a parameter (or a signal) may refer to actively generating, calculating, or determining the parameter (or the signal) or may refer to using, selecting, or accessing the parameter (or signal) that is already generated, such as by another component or device. Additionally, "adjusting" and "modifying" may be used interchangeably. For example, "adjusting" or "modifying" a parameter may refer to changing the parameter from a first value to a second value (a "modified value" or an "adjusted value"). As used herein, "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive electrical signals (digital signals or analog signals) directly or indirectly, such as via one or more wires, buses, networks, etc. As used herein, "directly coupled" may include two devices that are coupled (e.g., communicatively coupled, electrically coupled, or physically coupled) without intervening components.

A particular aspect of the disclosure relates to a metallic roller for use with an automated fiber placement machine. The metallic roller is designed to withstand high temperatures and is flexible enough to be used to manufacture contoured parts. In some implementations, the design of the metallic roller facilitates low cost manufacturing of the metallic roller via additive manufacturing processes, such as three-dimensional (3D) printing. For example, various feature of the metallic roller are shaped and sized to be additively manufactured without the use of support structures that are subsequently removed. In such implementations, no post fabrication processing, such as support structure clean up, is needed to prepare an additively manufactured metallic roller for use. Further, by using additive manufacturing processes to manufacture the metallic roller, the metallic roller can be formed as a single unitary metal body such that no assembly of parts is needed to prepare the metallic roller for use.

In a particular implementation, the roller includes a metallic rim member, a metallic hub member, and a plurality of curved metallic interconnect members (also referred to herein as "interconnect members" for ease of reference) extending between the metallic hub member and the metallic rim member. The interconnect members are configured to elastically deform responsive to force applied to the metallic rim member. The interconnect members also act as heat sinks to remove heat from the metallic rim member. Gaps between the interconnect members facilitate heat dissipation into the ambient surroundings or into a cooling medium (e.g., cooling air) blown through the gaps.

An outer side of the metallic rim member is smooth to press fiber tows to a workpiece. An inner side of the metallic rim member includes a plurality of grooves to allow the metallic rim member to flex (e.g., elastically deform) responsive to force applied to the outer side. For example, the grooves can include axial grooves, circumferential grooves, or both. In some implementations, the metallic rim member and the interconnect members deform elastically responsive to forces up to 40 pounds of force applied to the outer side. In a particular implementation, the metallic rim member and the interconnect members deform elastically responsive to forces up to 160 pounds of force applied to the outer side.

The metallic roller is able to withstand high temperature operation without degradation. For example, the metallic roller does not soften or off-gas at temperatures consistent with softening of thermoplastic polymers, such as temperatures greater than 270 degrees Celsius (° C.). In some implementations, materials used to form the metallic roller are stable (e.g., are not damaged by) exposure to temperatures of at least 700 to 750° C. Thus, in addition to being readily manufactured using additive manufacturing techniques, the metallic roller disclosed herein is not damaged by operating conditions that damage polymer-based rollers.

FIG. 1 is a diagram that illustrates an example of a system 100 for automated fiber placement according to a particular implementation. The system 100 includes an automated fiber placement machine 102 and a tooling surface 170. The tooling surface 170 is a surface of a mold or mandrel upon which a workpiece 104 is fabricated using multiple layers of composite material. The composite material includes one or more fiber tows 114 applied to the tooling surface 170 by the automated fiber placement machine 102. In some implementations, the fiber tows 114 are applied to form several layers (e.g., plies) of fibers to build up the workpiece 104 on the tooling surface 170.

The automated fiber placement machine 102 includes one or more fiber placement heads 106, one or more tow dispensers 112, one or more actuators 116, and one or more heat sources 118. Each tow dispenser 112 is configured to provide fiber tows 114 to the fiber placement head 106. In a particular implementation, each tow dispenser 112 includes a reel of fiber tow material (e.g., fiber tape) and passively dispenses the fiber tow material. For example, the fiber placement head 106 pulls the fiber tow material from the reel as the fiber placement head 106 applies the fiber tows 114 to the workpiece 104.

The one or more actuators 116 include one or more rotary actuators, one or more linear actuators, or combinations thereof, to move the fiber placement head 106 relative to the workpiece 104, to move the workpiece 104 relative to the fiber placement head 106, or both. The relative movement of the workpiece 104 and the fiber placement head 106 allows the fiber placement head 106 to apply the fiber tows 114 continuously over the tooling surface 170 or to particular target portions of the tooling surface 170 to build (or build up) the workpiece 104.

The one or more heat sources 118 are configured to direct heat 160 at targeted portions 168 of the workpiece 104 or of the tooling surface 170. In the specific implementation illustrated in FIG. 1, the fiber tows 114 include a plurality of fibers coupled to or embedded within a thermoplastic polymer, and the heat source(s) 118 applies the heat 160 to the portion(s) 168 to soften the thermoplastic polymer to facilitate adhesion between the fiber tows 114 in different layers of the workpiece 104. In some implementations, the heat source(s) 118 is configured to, during a fiber placement operation, heat portions of the workpiece 104 to a local temperature greater than 475° C. For example, as the actuator(s) 116 moves the fiber placement head 106 along a direction of travel 162 relative to the workpiece 104, the heat source(s) 118 heats the portion(s) 168 ahead of one or more rollers 110 of the fiber placement head 106. The roller(s) 110 applies the fiber tow(s) 114 to the workpiece 104 and applies a force 164 to consolidate layers of the workpiece 104. In some implementations, the rate of relative motion between the workpiece 104 and the fiber placement head 106 can be controlled to cause the heat source 118 to heat the portion 168 of the workpiece 104 to a working temperature that is greater than a glass transition temperature of a thermoplastic polymer of the fiber tows 114. In some implementations, a power output of the heat source 118, an orientation of the heat source 118, or both, is controlled to cause the heat source 118 to heat the portion 168 of the workpiece 104 to a working temperature that is greater than a glass transition temperature of the thermoplastic polymer.

Each fiber placement head 106 includes one or more shafts 108. One or more rollers 110 are coupled to each shaft 108. As explained above, each roller 110 is configured to press one or more fiber tows 114 onto the tooling surface 170 or onto a previously applied layer of the workpiece 104. Each roller 110 includes a metallic rim member 120, a metallic hub member 122, and multiple curved interconnect members 124 ("interconnect members") extending between the metallic rim member 120 and the metallic hub member 122. FIGS. 3A-3D illustrate an example of one particular implementation of the roller(s) 110.

The metallic hub member 122 includes a central opening 140 to receive the shaft 108 of the fiber placement head 106. In some implementations, the roller 110 is freely rotatable about the shaft 108. For example, the shaft 108 can be round and the central opening 140 can be round. In such implementations, a set of bearings can be disposed between the shaft 108 and the metallic hub member 122. In other implementations, the roller 110 rotates with the shaft 108. For example, the central opening 140 can be non-round (e.g., keyed or square) and the shaft 108 can have a corresponding shape to retain the roller 110. In such implementations, the shaft 108 includes bearings, or the shaft 108 is driven to cause rotation of the roller 110 during operation.

The interconnect members 124 are curved to facilitate flexing (e.g., elastic deformation) along a length of each interconnect members 124 between the metallic hub member 122 and the metallic rim member 120. In a particular implementation, each of the interconnect members 124 defines an S-shaped curve in a radial direction (e.g., extending along a direction corresponding to a radius of the roller 110). The roller 110 includes at least two interconnect members 124, and generally includes eight or more interconnect members 124. The interconnect members 124 are substantially evenly spaced apart circumferentially (e.g., in a direction corresponding to or along a circumference of the roller 110). Spaces between the interconnect members 124 facilitate cooling of the roller 110. For example, a coolant, such as airflow 166, can flow between and over the interconnect members 124 to remove heat from the roller 110.

In some implementations, each of the interconnect members 124 includes a plurality of relief openings 146. The relief openings 146 improve heat removal by increasing a surface area for contact with the airflow 166. The relief opening 146 are also sized and shaped to adjust (e.g., tune) elastic deformation characteristics (e.g., stiffness) of the interconnect members 124. For example, an interconnect member 124 can include many relatively small relief openings 146 along an interface with the metallic rim member 120 to facilitate small deformations due to local variations in force applied to the metallic rim member 120 (e.g., due to bumps in the surface of the workpiece 104). In this example, the interconnect member 124 can also include a smaller number of relatively large relief openings 146 closer to the metallic hub member 122 to adjust overall deformation characteristics of the interconnect member 124.

The metallic rim member 120 includes an inner side 126 and an outer side 128, where a central axis of the roller 110 is closer to the inner side 126 than to the outer side 128. In a particular implementation, the outer side 128 is substantially smooth to press the fiber tows 114 with a smooth surface. In some implementations, the outer side 128 can be textured if forming a smooth surface on the fiber tows 114 is not important at this stage of manufacturing, e.g., if a smooth outer surface is to be added to the workpiece 104 after the fiber tows 114 are added.

The inner side 126 of the metallic rim member 120 includes a plurality of grooves 134 to make the metallic rim member 120 more flexible (less stiff). For example, if the workpiece 104 is not planar (e.g., has curves, bumps, or surface discontinuities) and the metallic rim member 120 is not flexible, the roller 110 (or portions of the roller 110) can lose contact with the workpiece 104 as the roller 110 traverses a non-planar region. Losing contact in this way can result in the fiber tows 114 in that region not contacting underlying layers or not adhering properly to the underlying layers. To avoid this situation, the metallic rim member 120 is able to flex to maintain contact between the fiber tows 114 and the workpiece 104. In some implementations, the grooves 134 enable the metallic rim member 120 to flex in multiple directions. For example, the grooves 134 can include axial grooves 136 and circumferential grooves 138. In this context, "axial" means oriented in a direction that is parallel to or along a central axis of the roller 110, and "circumferential" means oriented in a direction that is similar (e.g., concentric with) to a circumference of the roller 110.

In a particular implementation, the roller 110 is a single unitary metal body that includes the metallic rim member 120, the metallic hub member 122, and the interconnect members 124. Additionally, in some implementations, respective edges of the metallic rim member 120, the metallic hub member 122, and the interconnect members 124 are coplanar. For example, the metallic rim member 120 includes a first edge 130 and a second edge 132, the metallic hub member 122 includes a first edge 142 and a second edge 144, and each of the interconnect members 124 includes a first edge 148 and a second edge 150. In this example, the first edges 130, 142, 148 are aligned (e.g., coplanar) with one another. To illustrate, the roller 110 can be manufactured using an additive manufacturing process to build the roller 110 on a build platform. In this illustrative example, the first edges 130, 142, 148 can correspond to portions of the roller 110 that contact the build platform during the additive manufacturing process and are therefore coplanar with one another. In some implementations, the second edges 132, 144, 150 are also aligned (e.g., coplanar) with one another.

During operation of the system 100, the heat source(s) 118 applies heat 160 to a portion 168 of the workpiece 104, the tooling surface 170, or both. The heat 160 is sufficient to soften a thermoplastic polymer of the fiber tows 114. For example, the portion 168 may be heated to a temperature that is greater than or equal to a glass transition temperature of the thermoplastic polymer.

Concurrently with or after the heat source(s) 118 heats the portion 168, the actuator(s) 116 moves the fiber placement head 106 over the workpiece 104 or the tooling surface 170. The actuator(s) 116 also applies a force to the fiber placement head 106 to press the roller(s) 110 into contact with the workpiece 104. The roller(s) 110 presses the fiber tow(s) 114 into contact with a surface of the workpiece 104. While the roller(s) 110 is in contact with or sufficiently near the heated portion 168 of the workpiece 104, the roller(s) 110 conducts heat away from the heated portion 168 to increase adhesion of the fiber tow(s) 114 to the heated portion 168. Heat removed from the heated portion 168 by the roller(s) 110 can be removed from the roller(s) 110 by the airflow 166 (or another coolant) flowing between the interconnect members 124. Removing heat from the fiber tow(s) 114 using the roller(s) 110 can reduce subsequent processing. For example, a next layer of fiber tow(s) 114 can be added without delay (or with less delay) for consolidation of the layers of the workpiece 104 (e.g., allowing the thermoplastic polymer to cool and harden).

The roller(s) 110 disclosed herein is able to withstand repeated use at high temperatures and with application of significant force 164 without degradation, unlike polymer-based rollers. Further, the roller(s) 110 disclosed herein does not off-gas at high temperatures, unlike polymer-based rollers. In addition, the metal body of the roller(s) 110 is a better heat conductor than polymers used for polymer-based rollers. As such, using the roller(s) 110 can improve the fiber placement operation by removing some of the heat 160 as the roller(s) 110 presses the fiber tows 114 to the workpiece 104, which allows the thermoplastic polymer of the fiber tows 114 to cool and adhere to underlying layers of the workpiece 104 thereby reducing subsequent processing, such as consolidation and curing operations.

Figure 2:
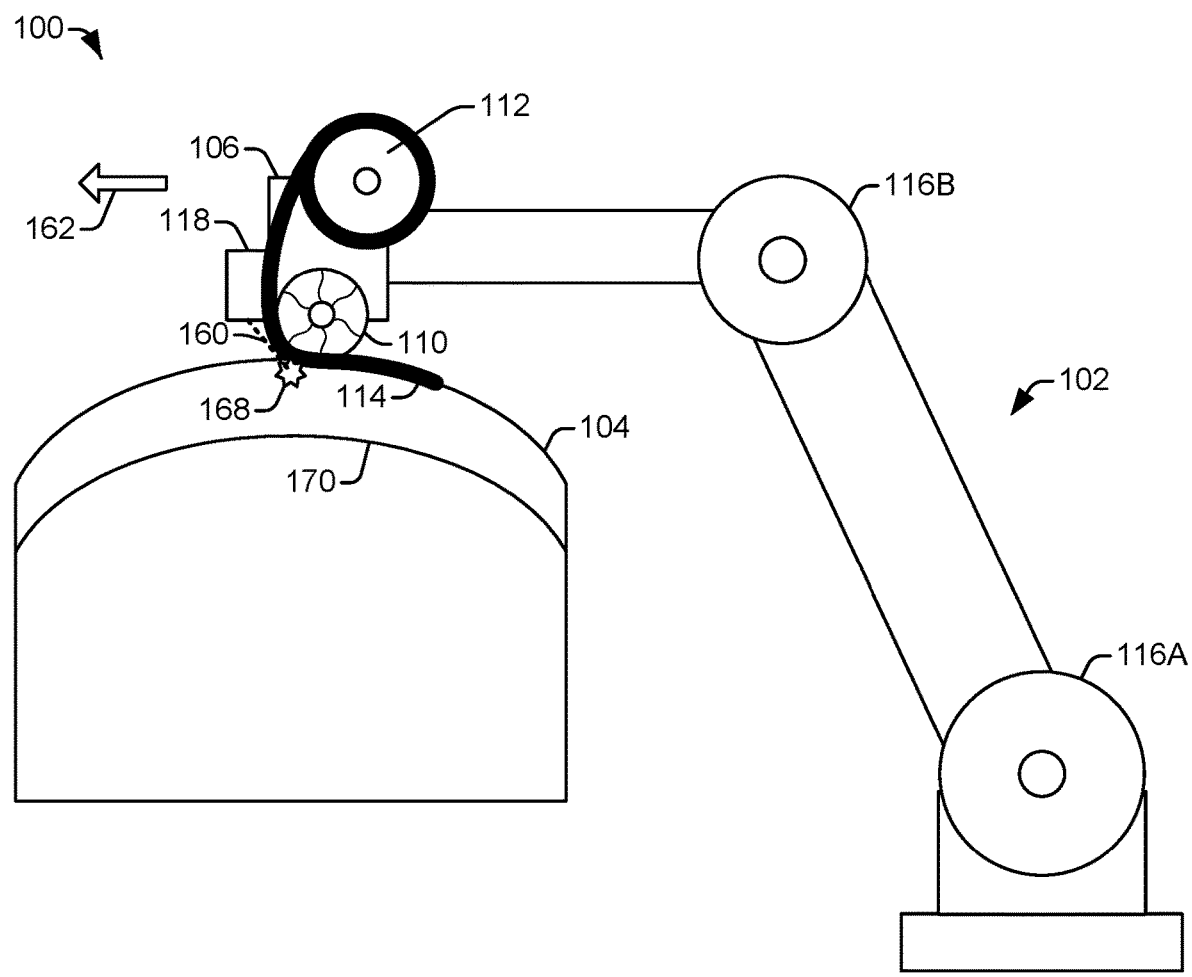
FIG. 2 is a diagram that illustrates another example of the system for automated fiber placement of FIG. 1.

FIG. 2 is a diagram that illustrates another example of the system 100 for automated fiber placement of FIG. 1. In FIG. 2, the automated fiber placement machine 102 is shown as a robotic arm including a plurality of actuators 116, including a first actuator 116A and a second actuator 116B. The fiber placement head 106 is coupled to an end of the automated fiber placement machine 102. The fiber placement head 106 includes the roller 110, the tow dispenser 112, and the heat source 118. In FIG. 2, the heat source 118 includes a laser which directs the heat 160 toward the portion 168 of the workpiece 104 as a beam of light.

After the portion 168 of the workpiece 104 is heated by the heat source 118, the automated fiber placement machine 102 moves the fiber placement head 106 along the direction of travel 162 and presses the roller 110 toward the workpiece 104. The roller 110 presses a fiber tow 114 into contact with the workpiece 104 to form another layer on the workpiece 104. The heat supplied by the heat source 118 softens a thermoplastic polymer of the fiber tow 114 as the fiber tow 114 is applied to the workpiece 104 and the roller 110 removes heat from the fiber tow 114 to harden the thermoplastic polymer to cause the fiber tow 114 to adhere to the workpiece 104.

Although FIG. 2 illustrates the automated fiber placement machine 102 as a robotic arm, in other implementations, the automated fiber placement machine 102 is arranged in a different configuration. For example, the fiber placement head 106 can be mounted on a gantry system that includes the actuators 116. Also, although FIG. 2 shows the fiber placement head 106 including a single roller 110, in some implementations, the fiber placement head 106 includes more than one roller 110. In such implementations, the rollers 110 can operation concurrently to apply multiple fiber tows 114 to the workpiece 104 at the same time. Further, although FIGS. 1 and 2 show the fiber tows 114 being applied to the workpiece 104, it should be understood that initial layers to form the workpiece 104 are applied to the tooling surface 170. During formation of the initial layer(s) on the tooling surface 170, the heat source 118 may heat a portion of the tooling surface 170 in front of the roller 110 along the direction of travel 162. Alternatively, the tooling surface 170 can include a second heat source (not shown) that heats the tooling surface 170 before or during application of fiber tows 114 to the tooling surface 170.

Figure 3A:
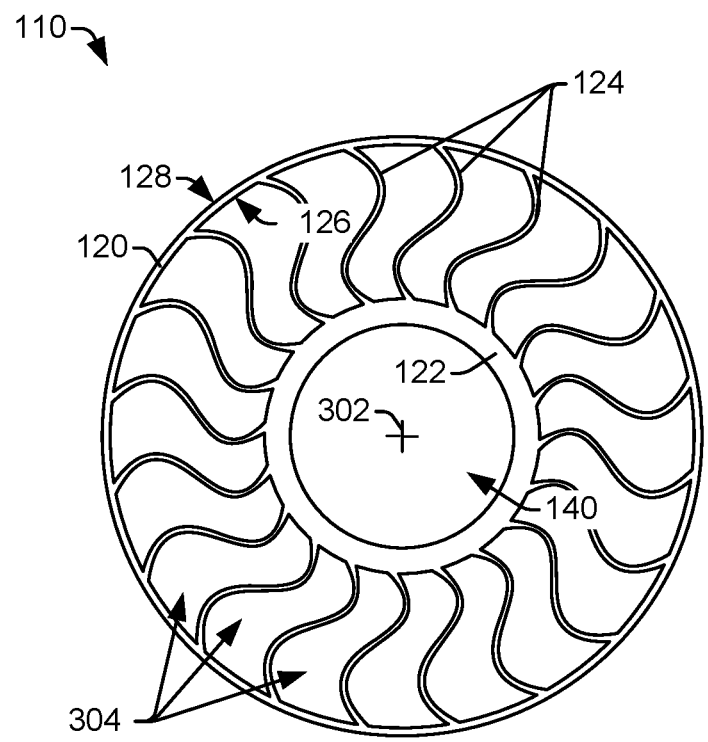
FIGS. 3A, 3B, 3C, and 3D are diagrams illustrating various views of an example of an automated fiber placement roller according to a particular implementation.
Figure 3B:
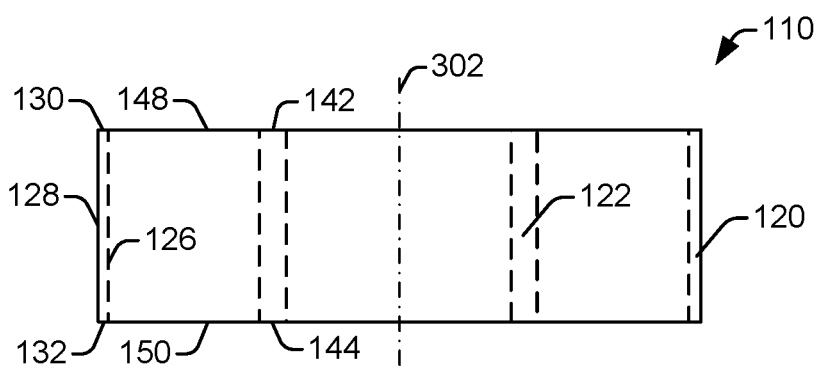
Figure 3C:
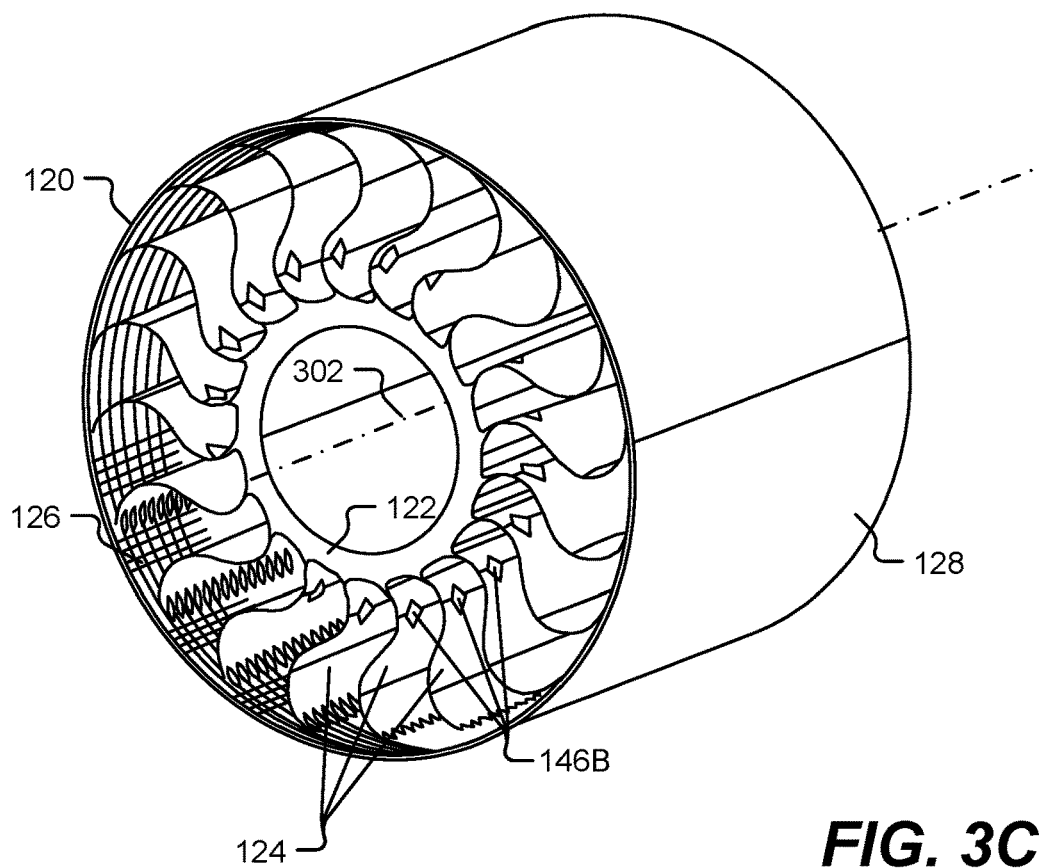
Figure 3D:
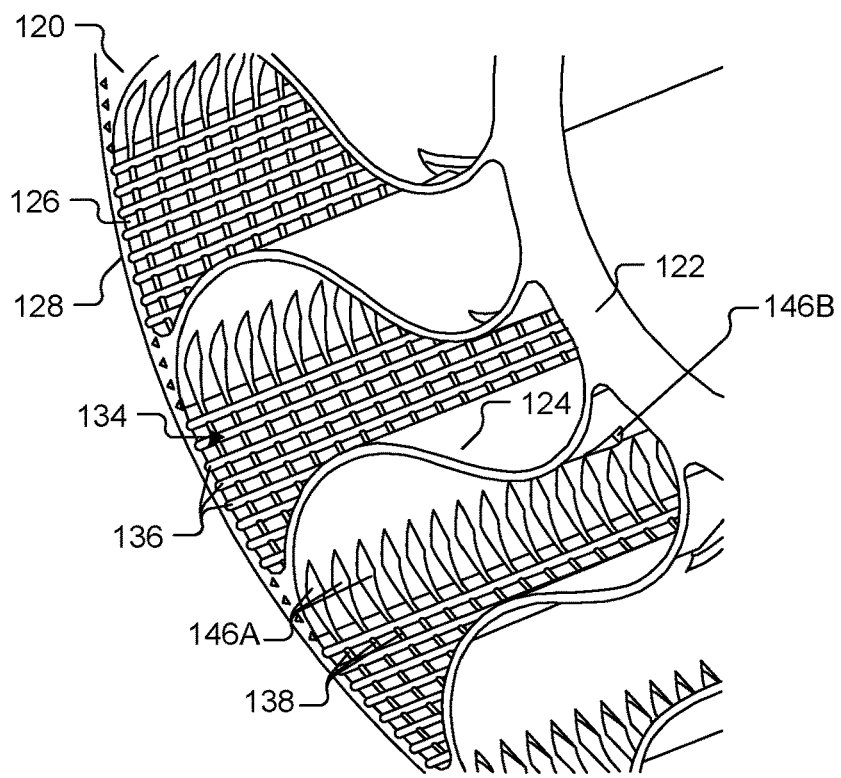

FIGS. 3A, 3B, 3C, and 3D are diagrams illustrating various views of an example of an automated fiber placement roller 110 according to a particular implementation. FIG. 3A shows a view along a central axis 302 of an example of the roller 110 according to a particular implementation. FIG. 3B shows a view perpendicular to the central axis 302 of the roller 110 of FIG. 3A. FIG. 3C shows a perspective view of the roller 110 of FIG. 3A. FIG. 3D shows a more detailed perspective view of the inner side 126 and several interconnect members 124 of the roller 110 of FIG. 3A.

FIGS. 3A, 3B, 3C and 3D illustrate the metallic rim member 120, the metallic hub member 122, and a plurality of curved metallic interconnect members 124 ("interconnect members") extending between the metallic rim member 120 and the metallic hub member 122. The metallic hub member 122 defines a central opening 140 around the central axis 302. In the example illustrated in FIGS. 3A-3D, the metallic rim member 120 is concentric with the metallic hub member 122 about the central axis 302. A plurality of gaps 304 are defined between the interconnect members 124 to facilitate heat removal and to provide space for flexing (e.g., elastic deformation) of the interconnect members 124. In FIGS. 3A-3D, each of the interconnect members 124 defines an S-shaped curve, in other implementations, the interconnect members 124 define a different curve shape, such as a C-shaped curve.

The metallic rim member 120 includes an outer side 128 and an inner side 126, where the central axis 302 is closer to the inner side 126 than to the outer side 128. The outer side 128 is substantially (e.g., within manufacturing tolerances) smooth. As best seen in FIG. 3D, the inner side 126 defines a plurality of grooves 134 that increase the flexibility of the metallic rim member 120 relative to an implementation of the metallic rim member 120 without the grooves. In FIG. 3D, the grooves 134 include multiple axial grooves 136 and multiple circumferential grooves 138 arranged in a grid. In the example illustrated, multiple axial grooves 136 are disposed between each pair of adjacent interconnect members 124. In other implementations, the grooves 134 include only the axial grooves 136 or only the circumferential grooves 138. In yet another implementation, the grooves 134 are arranged in a different manner, such as in a spiral arrangement along the inner side 126.

As best seen in FIGS. 3C and 3D, one or more of the interconnect members 124 includes relief openings 146 which are sized and shaped to tune the elastic deformation characteristics (e.g., stiffness) of the interconnect members 124. In the example illustrated, the relief openings 146 include first relief openings 146A at a first end (proximate to the inner side 126) of the one or more interconnect members 124 and second relief openings 146B at a second end (proximate to the metallic hub member 122) of the one or more interconnect members 124. In the example illustrated, each of the first relief openings 146A is aligned with a respective one of the circumferential grooves 138.

The number, shape, dimensions, and placement of the first relief openings 146A and the second relief openings 146B are selected in part to provide target elastic deformation characteristics to the roller 110. By omitting material that would be present if the interconnect members 124 did not have relief openings 146, the flexibility of each interconnect member 124 is increased and the stiffness is decreased. Larger relief openings 146 increase the flexibility more than the same number of smaller relief openings 146 because the larger relief openings leave less material of the interconnect member 124 to resist deformation. For similar reasons, more relief openings 146 of a particular size and shape increase the flexibility of the interconnect member 124 more than fewer relief openings 146 of the same size and shape. A relief opening 146 is more effective at increasing flexibility of the interconnect member 124 when the relief opening 146 is positioned near a bend of the interconnect member 124 since the bend provides a natural focus of bending motion of the interconnect member 124.

In some implementations, one or more of the relief openings 146 is shaped to enable additive manufacturing of the interconnect members 124 without use of temporary support structures. For example, an angle formed by edges of a relief opening 146 may be selected, in part, to enable building the interconnect member 124 in a layer-by-layer addition process without the need for temporary support structures to be fill-in and support portions of the interconnect member 124 that form the edges of the relief opening 146. The specific angle to avoid use of temporary support structures depends on the additive manufacturing process used. In some implementations, the grooves 134 are also shaped to enable additive manufacturing of the metallic rim member 120 without use of temporary support structures.

In some implementations, each of the interconnect members 124 includes a different number of the first relief openings 146A than of the second relief openings 146B. For example, each of the interconnect members 124 defines a first number of the first relief openings 146A and defines a second number of the second relief openings 146B, and the first number is different from the second number. In the example illustrated in FIGS. 3C and 3D, the first number is greater than the second number; however in other implementations, the second number is greater than the first number.

In some implementations, the first relief openings 146A have a different size than the second relief openings 146B. For example, each of the first relief openings 146A defines a corresponding first opening volume, each of the second relief openings 146B defines a corresponding second opening volume, and the first opening volume is different from the second opening volume. In the example illustrated in FIGS. 3C and 3D, the first opening volume is less than the second opening volume; however in other implementations, the second opening volume is less than the first opening volume.

FIG. 3B shows the first edge 130 of the metallic rim member 120 (e.g., a surface between the inner side 126 and the outer side 128) and the second edge 132 of the metallic rim member 120 (e.g., a surface between the inner side 126 and the outer side 128 on a side opposite the first edge 130). FIG. 3B also shows respective the first and second edges 142, 144 of the metallic hub member 122, and the first and second edges 148, 150 of the interconnect members 124. In the example illustrated, the first edges 130, 142, 148 are substantially coplanar with one another to facilitate fabrication via additive manufacturing (e.g., on a base plate or other support structure). In some implementations, the second edges 132, 144, 150 are also substantially coplanar with one another.

Figure 4:
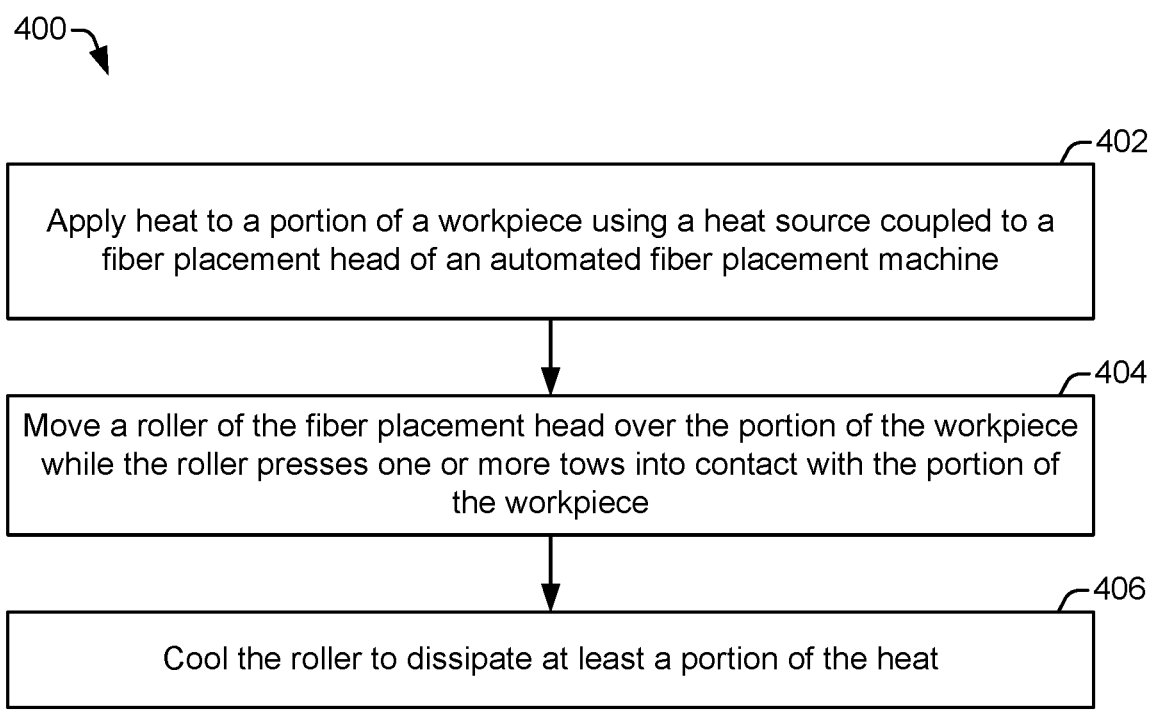
FIG. 4 is a flow chart of an example of a method of automated composite layup.

FIG. 4 is a flow chart of an example of a method 400 of automated composite layup. The method 400 includes, at 402, applying heat to a portion of a workpiece using a heat source coupled to a fiber placement head of an automated fiber placement machine. For example, the heat source 118 directs the heat 160 toward the portion 168 of the workpiece 104 (or of the tooling surface 170). In a particular implementation, the heat source 118 includes a laser source that directs the heat 160 via a beam of light.

The method 400 includes, at 404, after applying the heat to the portion of the workpiece, moving a roller of the fiber placement head over the portion of the workpiece while the roller presses one or more tows into contact with the portion of the workpiece. For example, the roller 110 of FIGS. 1-3D is used to press the fiber tows 114 into contact with the workpiece 104 or the tooling surface 170. In some implementations, the heat source 118 is controlled to heat the portion 168 of the workpiece 104 sufficiently to soften a thermoplastic polymer of the fiber tows 114. For example, the relative motion of the workpiece 104 and the fiber placement head 106 can be controlled to cause the heat source 118 to heat the portion 168 of the workpiece 104 to a working temperature that is greater than a glass transition temperature of the thermoplastic polymer. To illustrate, the heat source 118 can output heat at a relatively constant rate and the relative motion of the workpiece 104 and the fiber placement head 106 is controlled to control the working temperature of the portion 168. In another example, a power output of the heat source 118, an orientation of the heat source 118, or both, are controlled to cause the heat source 118 to heat the portion 168 of the workpiece 104 to a working temperature that is greater than a glass transition temperature of the thermoplastic polymer. To illustrate, the heat output of the heat source 118 can be pulsed or redirected (e.g., scanned) to control the working temperature.

The method 400 also includes, at 406, while moving the roller over the portion of the workpiece, cooling the roller to dissipate at least a portion of the heat. In a particular example, the roller is cooled by airflow between a metallic rim member of the roller, a metallic hub member of the roller, and a plurality of curved metallic interconnect members of the roller. For example, the heat can be conductively transferred from the workpiece 104 to the metallic rim member 120. In this example, the metallic rim member 120 conducts the heat to the interconnect members 124, and the interconnect members 124 transfer to the heat to the airflow 166 (or another coolant) flowing between the gaps 304 between the interconnect members 124.

Although one or more of FIGS. 1-4 may illustrate systems, apparatuses, and/or methods according to the teachings of the disclosure, the disclosure is not limited to these illustrated systems, apparatuses, and/or methods. One or more functions or components of any of FIGS. 1-4 as illustrated or described herein may be combined with one or more other portions of another of FIGS. 1-4. Accordingly, no single implementation described herein should be construed as limiting and implementations of the disclosure may be suitably combined without departing form the teachings of the disclosure. As an example, one or more operations described with reference to FIG. 4 may be optional, may be performed at least partially concurrently, and/or may be performed in a different order than shown or described.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. An automated fiber placement roller comprising:
a metallic rim member arranged about a central axis and having an inner side and an outer side, wherein the central axis is closer to the inner side than to the outer side, and wherein the inner side defines a plurality of grooves enabling elastic deformation of the metallic rim member responsive to a force applied to the outer side;
a metallic hub member arranged substantially concentric with the metallic rim member about the central axis, the metallic hub member defining an opening to receive a shaft of an automated fiber placement machine; and
a plurality of curved metallic interconnect members extending between the metallic hub member and the metallic rim member, each of the plurality of curved metallic interconnect members elastically deformable responsive to the force applied to the outer side.

2. The automated fiber placement roller of claim 1, wherein the plurality of grooves include multiple axial grooves disposed between each pair of adjacent metallic interconnect members of the plurality of curved metallic interconnect members.

3. The automated fiber placement roller of claim 1, wherein the plurality of grooves include multiple circumferential grooves.

4. The automated fiber placement roller of claim 1, wherein the outer side is substantially smooth.

5. The automated fiber placement roller of claim 1, wherein each of the plurality of curved metallic interconnect members defines an S-shaped curve.

6. The automated fiber placement roller of claim 1, wherein one or more curved metallic interconnect members of the plurality of curved metallic interconnect members defines a plurality of first relief openings at a first end of the one or more curved metallic interconnect members, the first end disposed proximate to the inner surface of the metallic rim member.

7. The automated fiber placement roller of claim 6, wherein each of the plurality of first relief openings aligns with a respective groove of the plurality of grooves.

8. The automated fiber placement roller of claim 1, wherein one or more curved metallic interconnect members of the plurality of curved metallic interconnect members defines a plurality of second relief openings at a second end of the one or more curved metallic interconnect members, the second end disposed proximate to the metallic hub member.

9. The automated fiber placement roller of claim 1, wherein one or more curved metallic interconnect members of the plurality of curved metallic interconnect members defines a first number of first relief openings at a first end of the one or more curved metallic interconnect members and defines a second number of second relief openings at a second end of the one or more curved metallic interconnect members, wherein the first number is different from the second number.

10. The automated fiber placement roller of claim 1, wherein one or more curved metallic interconnect members of the plurality of curved metallic interconnect members defines a plurality of first relief openings at a first end of the one or more curved metallic interconnect members and defines a plurality of second relief openings at a second end of the one or more curved metallic interconnect members, wherein each first relief opening of the plurality of first relief openings defines a corresponding first opening volume, wherein each second relief opening of the plurality of second relief openings defines a corresponding second opening volume, and wherein the first opening volume is different from the second opening volume.

11. The automated fiber placement roller of claim 1, wherein one or more curved metallic interconnect members of the plurality of curved metallic interconnect members defines one or more relief openings shaped to enable additive manufacturing of the one or more curved metallic interconnect members without use of temporary support structures.

12. The automated fiber placement roller of claim 1, wherein the metallic rim member has a first rim edge corresponding to a surface between the inner side and the outer side, the metallic hub member has a first hub edge, and each of the plurality of curved metallic interconnect members has a respective first interconnect edge, and wherein the first rim edge, the first hub edge, and each of the first interconnect edges are substantially coplanar.

13. The automated fiber placement roller of claim 12, wherein the metallic rim member has a second rim edge opposite the first rim edge, the metallic hub member has a second hub edge opposite the first hub edge, and each of the plurality of curved metallic interconnect members has a respective second interconnect edge opposite the corresponding first interconnect edge, and wherein the second rim edge, the second hub edge, and each of the second interconnect edges are substantially coplanar.

14. The automated fiber placement roller of claim 1, wherein the metallic rim member, metallic hub member, and the plurality of curved metallic interconnect members are formed as a single unitary metal body.

15. An automated fiber placement machine comprising:
a fiber placement head comprising a roller and a shaft extending through a central opening of the roller, the roller rotatable about the shaft and comprising:
a metallic rim member concentric with the central opening about a central axis and having an inner side and an outer side, wherein the central axis is closer to the inner side than to the outer side, and wherein the inner side defines a plurality of grooves enabling elastic deformation of the metallic rim member responsive to a force applied to the outer side;
a metallic hub member defining the central opening; and
a plurality of curved metallic interconnect members extending between the metallic hub member and the metallic rim member, each of the plurality of curved metallic interconnect members elastically deformable responsive to the force applied to the outer side; and
one or more actuators configured to adjust a relative position of the roller and a workpiece during addition of one or more fiber tows to the workpiece by the fiber placement head.

16. The automated fiber placement machine of claim 15, further comprising a heat source configured to, during a fiber placement operation, direct heat toward a portion of the workpiece ahead of the roller along a direction of travel of the roller relative to the workpiece, wherein the plurality of curved metallic interconnect members are spaced apart to enable airflow therebetween to remove heat from the roller.

17. The automated fiber placement machine of claim 15, further comprising a heat source configured to, during a fiber placement operation, heat a portion of the workpiece to a local temperature greater than 475 degrees Celsius.

18. A method of automated composite layup, the method comprising:
applying heat to a portion of a workpiece using a heat source coupled to a fiber placement head of an automated fiber placement machine;
after applying the heat to the portion of the workpiece, moving a roller of the fiber placement head over the portion of the workpiece while the roller presses one or more tows into contact with the portion of the workpiece; and
while moving the roller over the portion of the workpiece, cooling the roller to dissipate at least a portion of the heat, the roller cooled by airflow between a metallic rim member of the roller, a metallic hub member of the roller, and a plurality of curved metallic interconnect members of the roller, the plurality of curved metallic interconnect members extending between the metallic hub member and the metallic rim member, wherein an inner side of the metallic rim member defines a plurality of grooves, and wherein the plurality of grooves and the plurality of curved metallic interconnect members enable elastic deformation of the roller responsive to a force applied to press the one or more tows into contact with the portion of the workpiece.

19. The method of claim 18, wherein the one or more tows comprise a plurality of fibers coupled to or embedded within a thermoplastic polymer, and further comprising controlling relative motion of the workpiece and the fiber placement head to cause the heat source to heat the portion of the workpiece to a working temperature that is greater than a glass transition temperature of the thermoplastic polymer.

20. The method of claim 18, wherein the one or more tows comprise a plurality of fibers coupled to or embedded within a thermoplastic polymer, and further comprising controlling a power output of the heat source, an orientation of the heat source, or both, to cause the heat source to heat the portion of the workpiece to a working temperature that is greater than a glass transition temperature of the thermoplastic polymer.

* * * * *